United States Patent [19]

Honjo

[11] Patent Number: 4,821,087
[45] Date of Patent: Apr. 11, 1989

[54] ENCODER CIRCUIT ELIMINATING CARRIER LEAK

[75] Inventor: Masahiro Honjo, Neyagawa, Japan

[73] Assignee: Matsushita Electric Industrial Co., Ltd., Kadoma, Japan

[21] Appl. No.: 40,478

[22] Filed: Apr. 20, 1987

[30] Foreign Application Priority Data

Apr. 23, 1986 [JP] Japan ................................. 61-93775
Apr. 23, 1986 [JP] Japan ................................. 61-93781

[51] Int. Cl.⁴ ........................................... H04N 9/535
[52] U.S. Cl. ....................................... 358/34; 358/35; 358/21 R; 358/174
[58] Field of Search ..................... 358/36, 37, 38, 34, 358/21 R, 171, 172, 174, 179, 177, 35, 315, 327

[56] References Cited

U.S. PATENT DOCUMENTS

4,122,492 10/1978 Gallo ..................................... 358/34
4,434,439 2/1984 Steckler et al. ..................... 358/174
4,500,931 2/1985 Taguchi et al. ................. 358/315 X Primary Examiner—Howard W. Britton
Assistant Examiner—Victor R. Kostak
Attorney, Agent, or Firm—Wenderoth, Lind & Ponack

[57] ABSTRACT

Disclosed is an encoder circuit for converting a color difference signa into a carrier chrominance signal for use in a component VTR, camera, etc. The color difference signal is clamped by an automatic clamper, and then, this signal is used for balanced-modulating a color subcarrier whereby a first balanced-modulated output is obtained. Then, within a conversion circuit receiving the color subcarrier and the first balanced-modulated output as inputs thereto, a carrier leak existing in a predetermined period of the first balanced-modulated output is converted to D.C. levels changing at predetermined intervals. Here, the changes of the D.C. levels are such that their polarities aare inverted at the predetermined intervals with respect to a D.C. level appearing when no carrier leak exists. A difference between the D.C. levels changing at the predetermined intervals is detected, and a feedback loop is formed for controlling the D.C. level in the automatic clamper using the detected difference. Thus, an encoder circuit eliminating a carrier leak is realized.

13 Claims, 7 Drawing Sheets

ENCODER CIRCUIT ELIMINATING CARRIER LEAK

BACKGROUND OF THE INVENTION

1. Field of the Invention

The present invention relates to an encoder circuit for converting a color-difference signal into a carrier chrominance signal.

2. Description of the Prior Art

Figure 9:
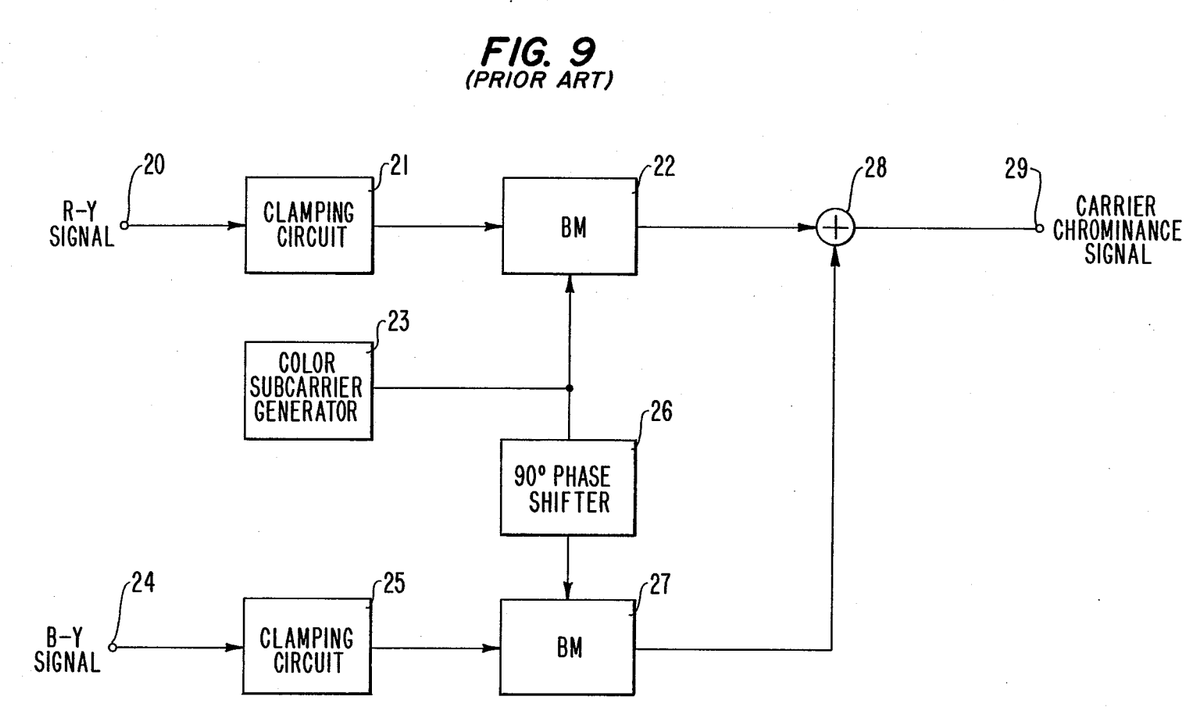
FIG. 9 is a block diagram of a conventional encoder circuit.

Recently, considerable development has been achieved in improvements in picture quality of video tape recorders (hereinafter to be briefly called VTR), and now, component VTRs, which record and play back component signals separated from a composite video signal, are prevalently used for broadcasting and industrial applications. However, composite video signals are frequently used in peripheral equipment, and therefore, there is the need for signal conversion between such equipment and the component VTRs. Conventionally, the signal processing circuit as the encoder circuit for converting the component signals into the composite signal has been constructed as shown in FIG. 9. Color difference signals, R-Y signal and B-Y signal, for example, inputted to terminals 20, 24 are delivered through clamping circuits 21, 25 to balanced modulators (hereinafter to be briefly called BM) 22, 27, for modulating color subcarriers (3.579545 MHz in the NTSC system), which are generated by a color subcarrier generator 23 and a 90° shifter 26 so as to have phase angles 90° apart from each other, and the modulated signals are then mixed by a mixer 28 to be outputted from a terminal 29.

With this construction, however, the input signals would not be completely clamped by the clamping circuits 21, 25 due to malfunction of the clamping circuits or due to temperature characteristics of the clamping circuits or the BMs. That is, even if the color difference signal is at zero level, the color subcarrier would leak to be outputted, i.e., a so-called "carrier leak" would occur to cause changes in hue and saturation of the output chrominance signal thereby to greatly deteriorate the picture quality.

SUMMARY OF THE INVENTION

A primary object of the present invention is to provide an encoder circuit which produces no carrier leak even if characteristics of the clamping circuit or balanced modulators change with temperature.

According to the encoder circuit of the present invention, a color-difference signal is clamped by an automatic clamper circuit, and then modulates a color subcarrier, thereby to obtain a first balanced-modulated output. Then, using a conversion circuit receiving the color subcarrier and the first balanced-modulated output as inputs thereto, a carrier leak existing in the first balanced-modulated output in a predetermined period is converted to D.C. levels changing at predetermined intervals. Here, the changes of the D.C. levels are such that their polarities are inverted at the predetermined intervals with respect to a D.C. level appearing when no carrier leak exists. The changes of, or differences between, the changing D.C. levels are detected and fed back to the automatic clamping circuit to control the D.C. level of the automatic clamping circuit, thereby eliminating the carrier leak.

An example of the conversion circuit used in the present invention comprises a phase inverter circuit for inverting the phase of the color subcarrier at the predetermined intervals, and a second balanced modulator for balanced-modulating the output of the phase inverter circuit in accordance with the output of the first balanced modulator.

Another example of the conversion circuit used in the present invention comprises a phase inverter circuit for inverting the phase of the output of the first balanced modulator at the predetermined intervals, and a second balanced modulator for balanced-modulating the color subcarrier in accordance with the output of the phase inverter circuit.

A further example of the conversion circuit used in the present invention comprises a switching circuit for switching the outputs of the first balanced modulator into two lines at the predetermined intervals, and a second balanced modulator to receive the two outputs of the switching circuit as two differential inputs thereto and further to receive the color subcarrier as another input thereto for making a balanced modulation.

The present invention with the above-described construction detects the amount of carrier leak and thereby controls the automatic clamping circuit so that the carrier leak is minimized. Thus, an encoder circuit producing no carrier leak even if there occur temperature changes or the like can be realized.

The above and other objects, features and advantages will be apparent from consideration of the following description taken in connection with the accompanying drawings in which:

DESCRIPTION OF THE PREFERRED EMBODIMENTS

Figure 1:
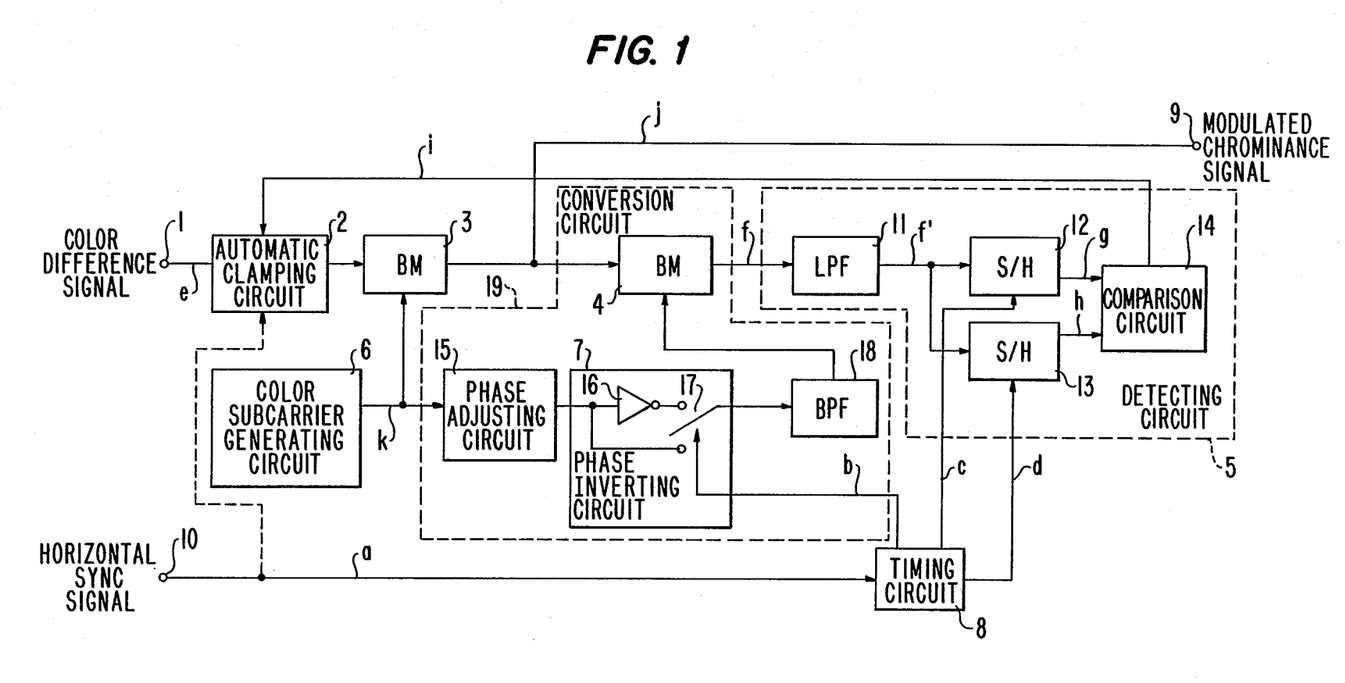
FIG. 1 is a block diagram showing a first embodiment of the present invention.
Figure 4:
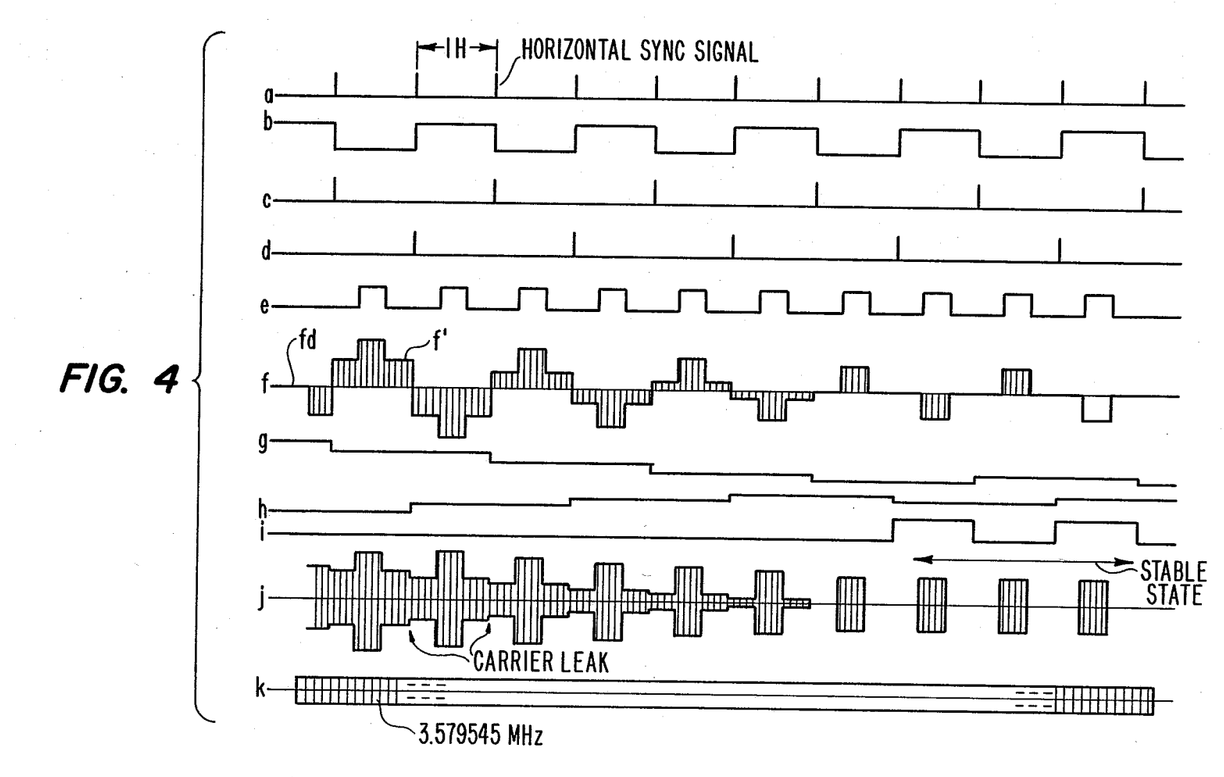
FIG. 4 is a diagram showing waveforms at respective points in each of FIGS. 1, 2, and 3.

A first embodiment of the present invention will be described in the following. FIG. 1 is a block diagram showing the first embodiment and FIG. 4 is a diagram showing waveforms at respective points in FIG. 1. Reference symbols A-K to the waveforms in FIG. 4 correspond to the points A-K A color-difference signal inputted to an input terminal 1 is optimally clamped by an automatic clamping circuit 2, and then applied to a balanced modulator (BM) 3 for modulating a color subcarrier k (3.579545 MHz in the NTSC system) from a color subcarrier generating circuit 6. The modulated output signal j is outputted from a terminal 9. The signal j, which is a chrominance signal of 3.579545 MHz in the case of the NTSC signal, is controlled by the present invention so as not to produce a carrier leak in the horizontal blanking intervals.

Meanwhile, the color subcarrier k is also inputted to a conversion circuit 19. Within the conversion circuit 19, the color subcarrier k is subjected to phase adjustment in a phase adjusting circuit 15. Then, the phase is alternately inverted by a phase inverting circuit 7 according to a signal b from a timing circuit 8. The phase inverting circuit 7 is made up of an inverter 16 for inverting the phase of the color subcarrier k and a switch 17 for making switching operation alternately in response to the signal b. Here, it is not necessary for the phase inverting circuit 7 to change the phase by 180° because it is only required that the phase is changed, but in view of the detecting sensitivity, it is preferred that the phase is changed virtually by 180°.

Output of the phase inverting circuit 7 is inputted to an input terminal of a balanced modulator (BM) 4 through a bandpass filter (BPF) 18. On the other hand, the output signal j of the BM 3 is inputted to the other input terminal of the BM 4, and therefore, a modulated signal f is obtained at an output terminal of the BM 4. The output signal f of the BM 4 is passed through a low-pass filter (LPF) 11 in a detection circuit 5 to be a signal f' eliminated of high frequency components. The signal f' is a signal held at a fixed D.C. level fd when there is no carrier leak in the signal j, but, when there is a carrier leak, its polarities are alternately changed into opposite directions, or inverted, with respect to the D.C. level fd at intervals of one horizontal scanning period (1H). This is effected by the operation of the phase inverting circuit 7 which inverts the signal it delivers to the BM 4 at the intervals of 1H, and this is the essential point of the present invention. FIG. 4 shows the process from when the clamping D.C. level of the automatic clamping circuit was deviated from the optimum level to when the same is automatically brought to the optimum level.

The signal f' is sampled and held by sample-and-hold circuits 12, 13 according to signals c, d from the timing circuit 8, and output signals g, h therefrom are compared with each other by a comparison circuit 14. Here, since the signals c, d are generated alternately during the horizontal blanking periods at the intervals of 1H as shown in FIG. 4, the signals g, h are in effect the D.C. levels of the signal f' during the horizontal blanking periods at the intervals of 1 H. The comparison circuit 14 feeds its output signal i back to the clamping circuit 2, which controls its clamping level so that the difference between the D.C. levels of the signals g, h is minimized. When the difference between the D.C. levels of the signals g, h has been minimized, and hence the clamping action producing no carrier leak has been achieved, the signal i repeats such oscillation that is alternately inverted at the intervals of 1H, which is a balanced state.

Here, the comparison circuit 14 may be made up of a so-called comparator, but it may also be made up of an operational amplifier with feedback from its output stage to its input stage so as to output a signal corresponding to the difference between the levels of the input signals g, h.

The circuit blocks 11, 12, 13 and 14 constitute the detection circuit 5.

Figure 8:
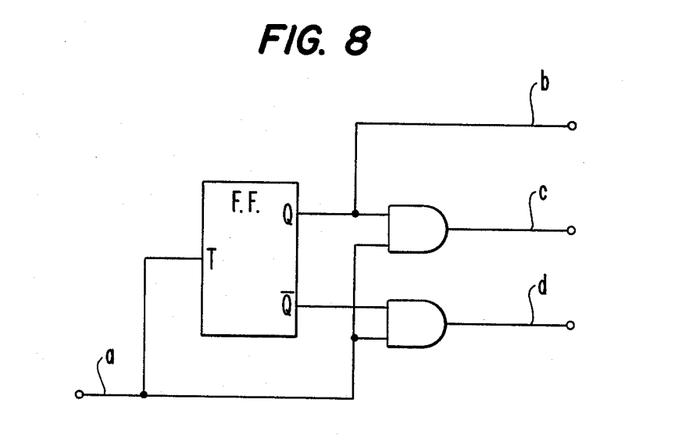
FIG. 8 is a concrete circuit diagram of a timing circuit.

The timing circuit 8 is simply constructed by a flip-flop circuit and two AND gates, for example, as shown in FIG. 8. It is supplied with the horizontal synchronizing signal a at its input terminal 10, and outputs the signal b inverted at the intervals of 1 H for switching the switch 17, and the signals c and d which are horizontal synchronizing signals alternately gated at the intervals of 1 H.

Thus, color-difference signal is constantly controlled so that there is no difference between the D.C. levels in the horizontal blanking periods. Namely, the color-difference signal is encoded free from a carrier leak.

Figure 2:
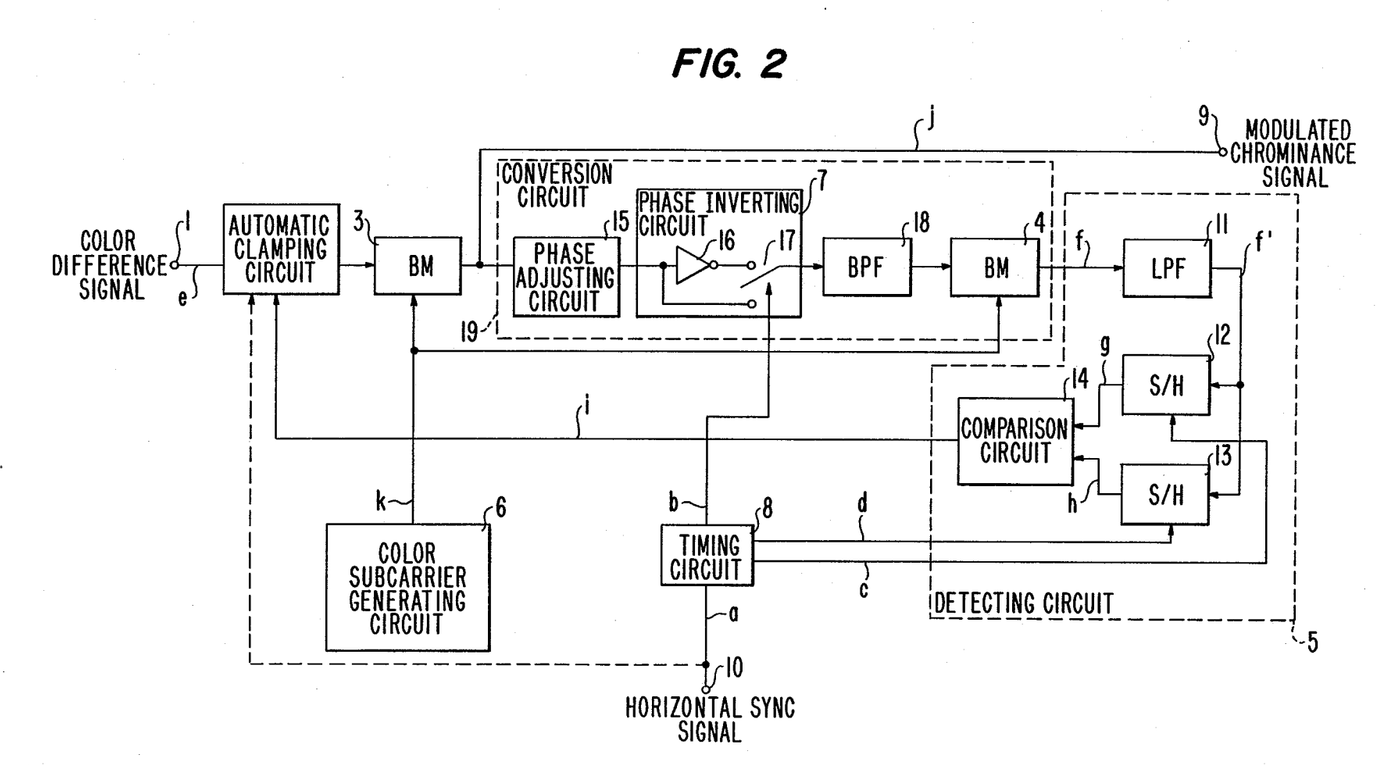
FIG. 2 is a block diagram showing a second embodiment of the present invention.

A second embodiment of the present invention will now be described. FIG. 2 is a block diagram showing the second embodiment of the invention, and A-K of FIG. 4 corresponds to A-K in FIG. 2. Since the second embodiment differs from the first embodiment only in the internal arrangement of the conversion circuit 19, the operation of the conversion circuit will only be described below.

The output signal j of the BM 3 is inputted to the conversion circuit 19. Within the conversion circuit 19, the signal j is adjusted for its phase by a phase adjusting circuit 15, and then its phase is alternately inverted by a phase inverting circuit 7 according to the signal b from the timing circuit 8. The phase inverting circuit 7 is made up of an inverter 16 for inverting the phase of the signal j and a switch 17 for switching alternately in response to the signal b. Here, it is not necessary for the phase inverting circuit 7 to change the phase by 180° because it is only required that the phase is changed, but in view of the detecting sensitivity, it is preferred that the phase is changed virtually by 180°.

The output signal of the phase inverting circuit 7 is inputted to one input terminal of a BM 4 through a BPF 18. Since the color subcarrier k is inputted to the other input terminal of the BM 4, the modulated signal f is obtained at its output terminal. By passing the output signal f of the BM 4 through the LPF 11, the signal f' is obtained. Other operations are the same as in the first embodiment.

Figure 3:
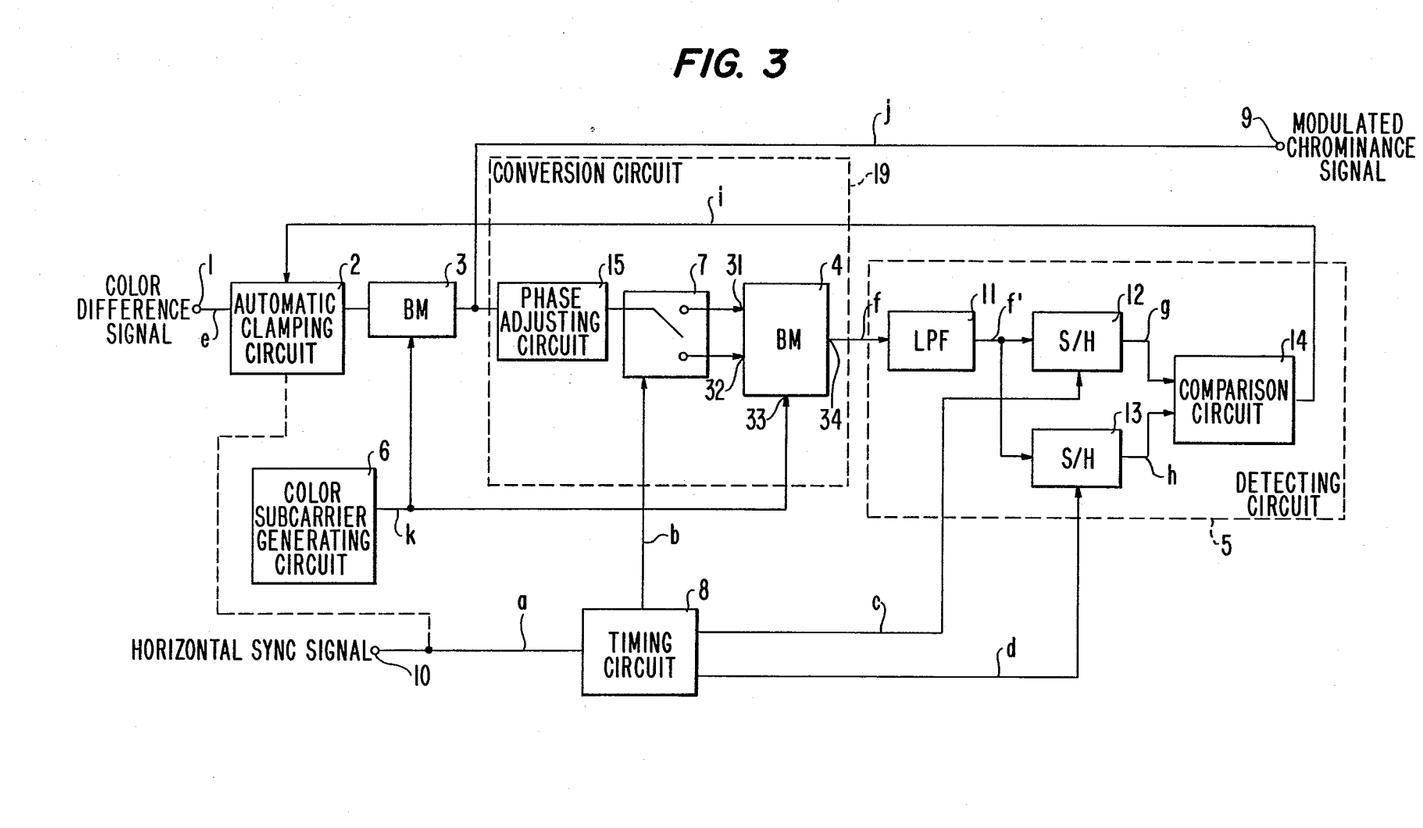
FIG. 3 is a block diagram showing a third embodiment of the present invention.

Now, a third embodiment of the present invention will be described. FIG. 3 is a block diagram showing the third embodiment of the invention, and A-K of FIG. 4 correspond to a-k in FIG. 3. Since the third embodiment differs from the first embodiment only in the internal arrangement the conversion circuit 19, the operation of the conversion circuit will only be described below.

Figure 7:
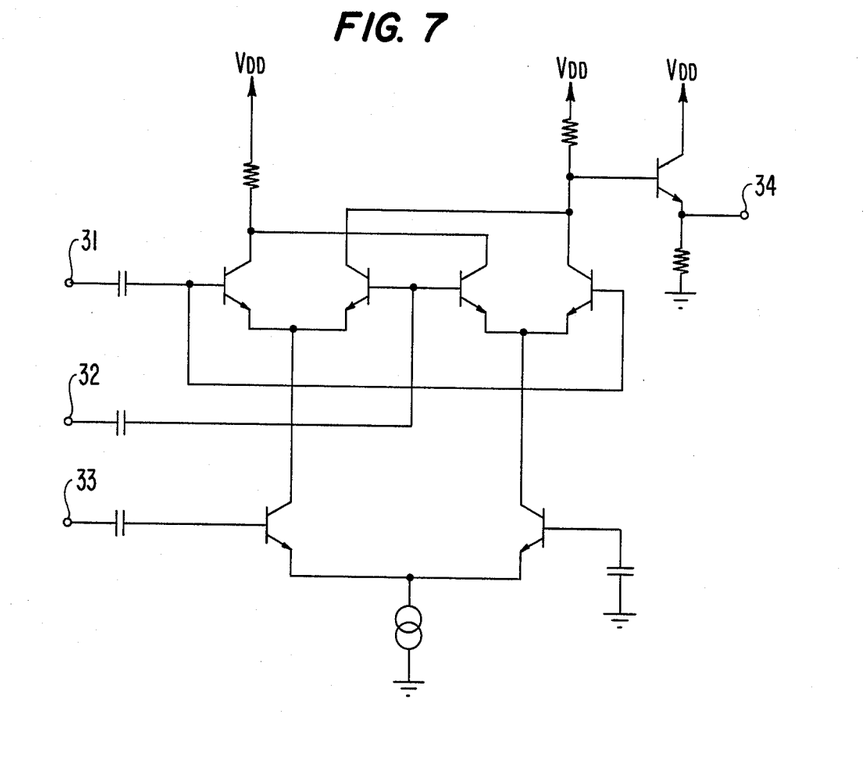
FIG. 7 is a circuit diagram of a typical balanced modulator used in each embodiment.

The output signal j of the BM 3 is inputted to the conversion circuit 19. Within the conversion circuit 19, the signal j is adjusted for its phase by a phase adjusting circuit 15, and then switched into two lines by a switching circuit 7 in response to the signal b from the timing circuit 8. Here, the switching circuit 7 is made up, for example, of an analog switch or the like and the outputs from the switching circuit 7 are inputted to two differential inputs 31, 32 of a balanced modulator BM 4 constructed as shown in FIG. 7. Since another input 33 of of the BM 4 is applied with the color subcarrier k, the modulated signal f is obtained at an output terminal 34. By passing the output signal f of the BM 4 through the LPF 11 the signal f' is obtained. Further description of FIG. 7 will be given later. Other operations than described above are the same as in the first embodiment.

Figure 5:
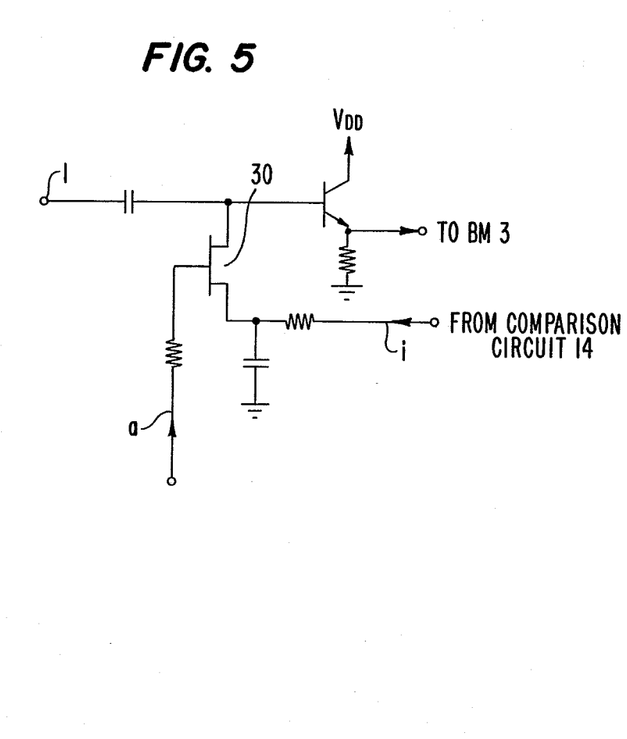
FIG. 5 and FIG. 6 are concrete circuit diagrams of automatic clamping circuits.
Figure 6:
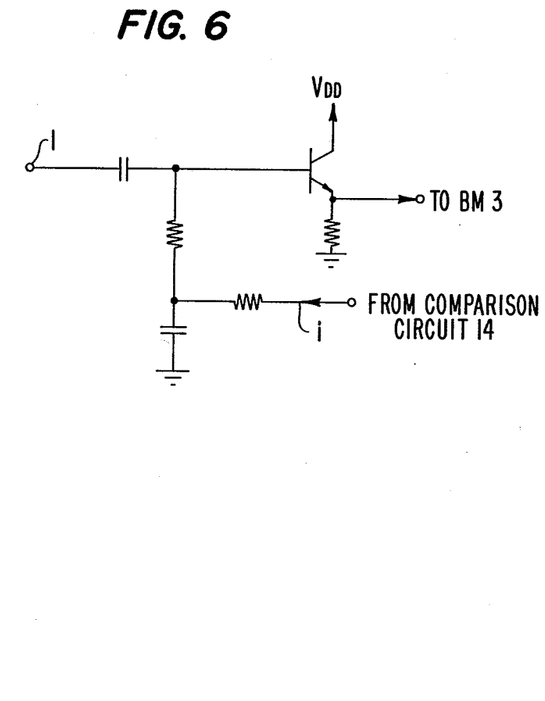

Examples of the automatic clamping circuit 2 are shown in FIGS. 5 and 6. The example shown in FIG. 5 makes clamping by an FET 30 during the horizontal blanking periods according to an external pulse and the output signal of the comparison circuit 14 through a LPF. The example shown in FIG. 6 makes clamping by a resistor according to the output signal of the comparator circuit 14 through a LPF. In the case of FIG. 5, the horizontal synchronizing signal a must be supplied as indicated by a dotted line in each of FIGS. 1, 2, and 3. Various other known clamping circuits can be usable.

Incidentally, the phase adjusting circuit 15 and the BPF 18 in each of the above described three embodiments have nothing to do directly with the present invention and can be omitted. Further, the color subcarrier generating circuit 6 also becomes unnecessary if, for example, the color subcarrier is supplied from outside as frequently happens. Furthermore, since two component color-difference signals are usually used such as R-Y signal and B-Y signal, two sets of the encoler circuits according to the present invention may be used, where, however, it is preferred that the two sets share the circuits 6, 15, 7, 18 and 8.

A typical example circuit of the balanced modulator used in the above embodiments is shown in FIG. 7. The two differential inputs mentioned above are the terminals 31, 32; the terminal to which the color subcarrier is input is the terminal 33; and the output signal is delivered from the terminal 34. In FIG. 7, however, the bias circuit and others are omitted. And, in the first and second embodiments, the balanced modulator is used with either one of the differential input terminals 31, 32 grounded by a proper A.C. grounding method.

In addition, although the above-described embodiments are analog circuits, it is of course possible to organize them in digital circuits within the scope of the present invention. In such cases, the information from the detection circuit may be fed back to the clamping circuit placed in the front stage of an A/D converter.

Further, the color subcarrier generating circuit shown in the embodiments may in gereral be a continuous wave generator circuit, and the input signal is not limited to the color difference signal. No matter of what kind the input signal may be, it is apparent that balanced modulation free from a carrier leak can be achieved by the present invention at any signal level.

WHAT IS CLAIMED IS:

1. An encoder circuit comprising:
    an automatic clamper for clamping an input signal to a predetermined level according to a control signal;
    a balanced modulator for balanced-modulating a continuous wave signal in accordance with an output signal from said automatic clamper;
    a conversion circuit receiving an output signal of said balanced modulator and said continuous wave signal for converting a carrier leak existing in a predetermined period in the output signal of said balanced modulator into changes of D.C. levels whose polarities are inverted at predetermined intervals with respect to a D.C. level appearing when no carrier leak exists;
    a detection circuit to for detecting a difference between the D.C. levels from said conversion circuit changing at said predetermined intervals, said difference being applied as said control signal to said automatic clamper; and
    a timing circuit for generating timing signals for controlling said conversion circuit and detection circuit,
    whereby said automatic clamper controls its clamping level so that said difference between the D.C. levels is minimized, thereby eliminating said carrier leak.

2. An encoder circuit according to claim 1, wherein said input signal is a color difference signal and said continuous wave signal is a color subcarrier.

3. An encoder circuit according to claim 2, wherein said predetermined intervals are intervals of one horizontal scanning period of the color difference signal.

4. An encoder circuit according to claim 2, wherein said predetermined period is a horizontal blanking interval of the color difference signal.

5. An encoder circuit according to claim 1, wherein said detection circuit comprises:
    a low-pass filter for eliminating high frequency components of an output signal of the conversion circuit;
    two sample-and-hold circuits for sampling and holding an output signal of said low-pass filter according to timing signals from said timing circuit alternately generated at said predetermined intervals; and
    a comparison circuit for comparing output signals of said two sample-and-hold circuits to produce said control signal.

6. An encoder circuit according to claim 1, wherein said conversion circuit comprises:
    a phase inverting circuit for inverting the phase of said continuous wave signal at said predetermined intervals; and
    a second balanced modulator for balanced-modulating an output signal of said phase inverting circuit in accordance with the output signal of said balanced modulator.

7. An encoder circuit according to claim 6, wherein said continuous wave signal is inputted to said phase inverting circuit through a phase adjusting circuit.

8. An encoder circuit according to claim 6, wherein the output signal of said phase inverting circuit is inputted to said second balanced modulator through a band-pass filter.

9. An encoder circuit according to claim 1, wherein said conversion circuit comprises:
    a phase inverting circuit for inverting the phase of the output signal of said balanced modulator at said predetermined intervals; and
    a second balanced modulator for balanced-modulating said continuous wave signal in accordance with an output signal of said phase inverting circuit.

10. An encoder circuit according to claim 9, wherein the output signal of said balanced modulator is inputted to said phase inverting circuit through a phase adjusting circuit.

11. An encoder circuit according to claim 9, wherein the output signal of said phase inverting circuit is inputted to said second balanced modulator through a band-pass filter.

12. An encoder circuit according to claim 1, wherein said conversion circuit comprises:
    a switching circuit for switching the output signal of said balanced modulator into two lines at said predetermined intervals; and
    a second balanced modulator to receive the two lines of output signals from said switching circuit as two differential inputs thereto and further to receive said continuous wave signal as another input thereto for making a balanced modulation therewith.

13. An encoder circuit according to claim 12, wherein the output signal of said balanced modulator is inputted to said switching circuit through a phase adjusting circuit.

* * * * *